Dec. 7, 1937.                G. HENKEL                 2,101,543
                          PHOTOGRAPHIC CAMERA
                          Filed April 30, 1936              2 Sheets-Sheet 1
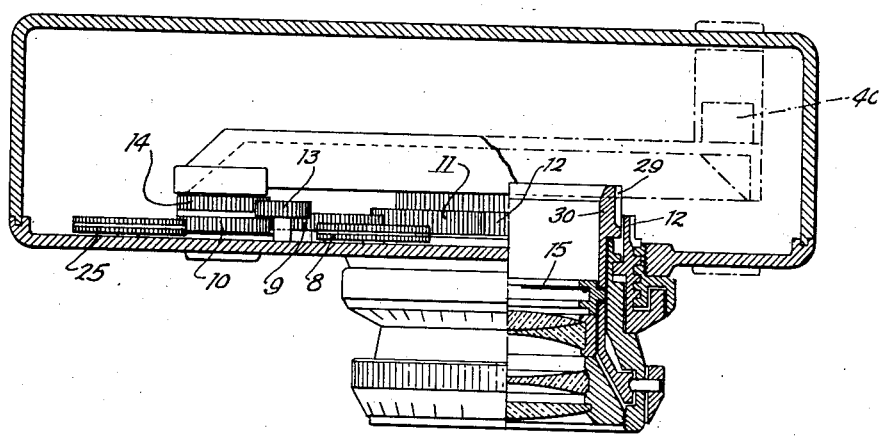
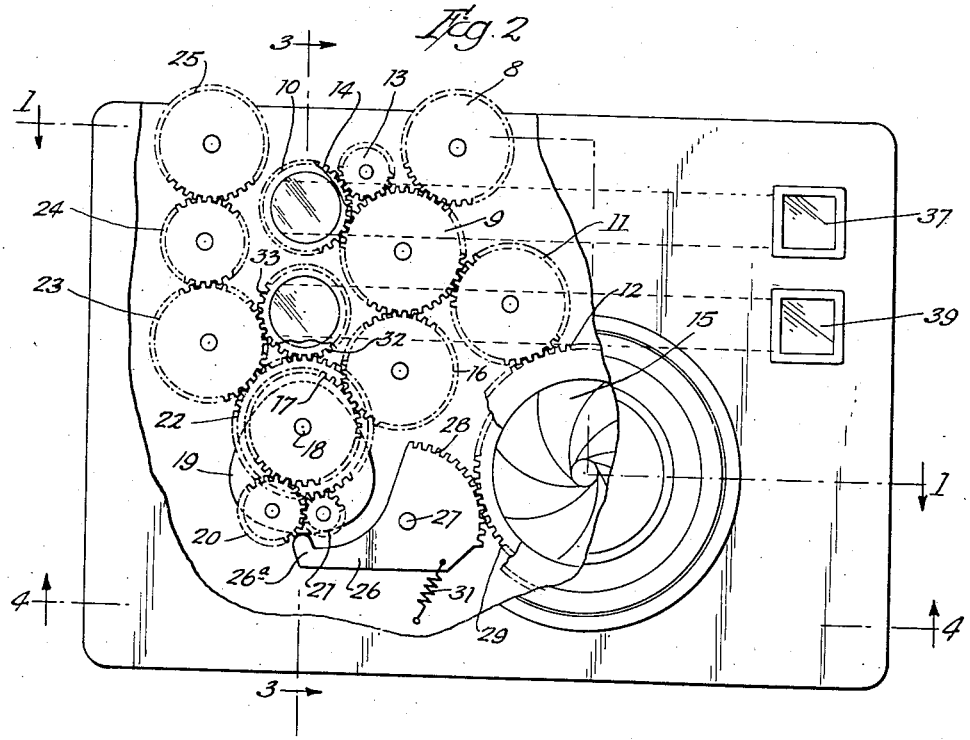
Inventor:
Gerhard Henkel
by B. Singer
his Atty.

Dec. 7, 1937.　　　　　G. HENKEL　　　　　2,101,543
PHOTOGRAPHIC CAMERA
Filed April 30, 1936　　　　2 Sheets-Sheet 2
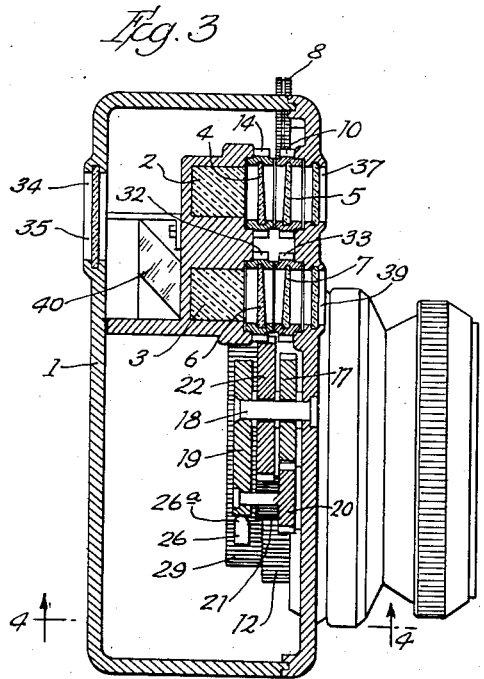
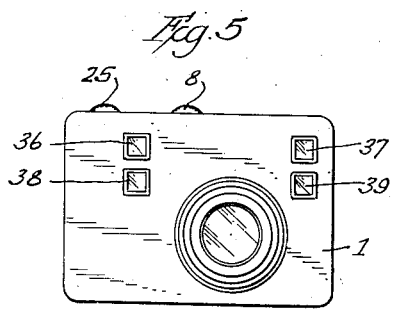
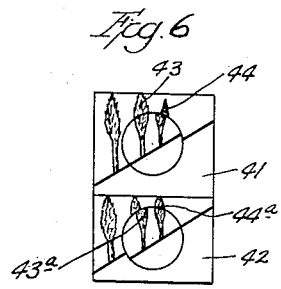
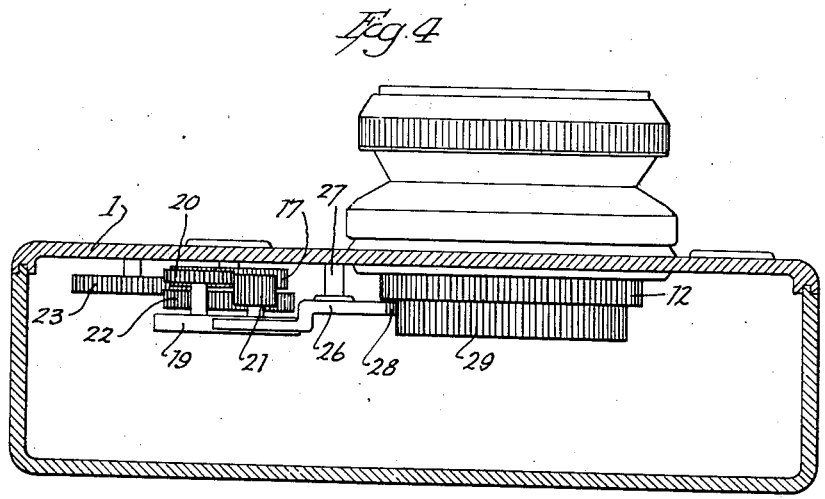
Inventor:
Gerhard Henkel
by B. Singer
his Atty.

Patented Dec. 7, 1937

2,101,543

UNITED STATES PATENT OFFICE 2,101,543

PHOTOGRAPHIC CAMERA

Gerhard Henkel, Dresden, Germany, assignor to Zeiss Ikon Aktiengesellschaft, Dresden, Germany Application April 30, 1936, Serial No. 77,161

8 Claims. (Cl. 95—44)

This invention relates to photographic cameras and particularly it relates to an improvement in the art of accurately focusing the lens system by means of a base range finder.

The principle of the base range finder is known to reside in the fact that the remote object is viewed from two different points simultaneously. The two images are then caused to register with each other for which purpose means for deflecting the light rays are used. The simultaneous observation of the two images may be effected by means of mirrors or prisms, while the deflection of the light rays is brought about through rotation of a mirror or a prism having total reflection or it is brought about by means of an optical wedge having a variable wedge angle. Such an optical wedge, for instance, may be composed of a pair of rotary prisms or a pair of rotary lenses. This method of measuring the distance, according to the optical laws, permits now only the registration of images all points of which are positioned in a single plane while those points of the object which are outside of this sharply defined plane, cannot be brought into proper registration in the range finder. A base distance meter, therefore, does not have any depth of focus, as for instance, a lens has.

Upon coupling a base range finder with the lens system of a photographic camera for the purpose of focusing the lens, the base range finder becomes a measuring instrument which operates with excessive accuracy, since the lens of the camera will reproduce very sharply certain portions of the object even though these portions are not in registration in the base range finder. The photographer is therefore tempted to readjust the base range finder continuously to obtain a complete registration, particularly when photographing moving objects, although this continued adjustment of the range finder is really unnecessary owing to the inherent depth of focus of the lens system.

It is now an object of the invention to take the depth of focus into consideration simultaneously with the adjustment of the distance, and for this purpose the camera is provided with a second base range finder. This second base range finder is operatively connected with the diaphragm adjusting device of the lens system, by means including a train of gears. The diaphragm adjusting device is also coupled with the first base range finder in such a manner that when adjusting the first range finder to focus the object to be photographed sharply, the diaphragm is also adjusted with respect to the object to be photographed without, however, varying the adjustment of the second base range finder. Since now this second range finder is connected by its associated train of gears with the diaphragm adjusting device, it is only necessary for the purpose of obtaining the desired depth of focus to adjust the second range finder, for instance with respect to an object which lies further back in the scene to be photographed.

The drawings show by way of example one embodiment of the invention.

Fig. 1 is a horizontal cross-sectional view of the camera substantially of the broken line I—I of Fig. 2 looking in the direction of the arrows;

Fig. 2 is a front elevation view of the camera with a portion of the front wall broken away to show the gearings;

Fig. 3 is a vertical cross-sectional view, substantially on the line III—III of Fig. 2, looking in the direction of the arrow;

Fig. 4 is a horizontal cross-sectional view substantially on the line IV—IV of Fig. 2 or 3, looking in the direction of the arrow;

Fig. 5 is a front elevation view of the camera in a reduced scale, and

Fig. 6 shows the images produced by the two range finders as observed by the photographer.

In accordance with the invention, two base range finders, comprising rhomboid prisms 2 and 3 respectively, are located in the upper portion of the camera housing 1. In front of these prisms are disposed light rays deflecting means in the form of rotary glass wedges 4, 5 and 6, 7 respectively. The elements of each pair of said rotary glass wedges are simultaneously adjustable in opposite direction relatively to each other.

The rotary glass wedges 4, 5 are operatively connected by a train of gears with the focusing device of the lens system and the rotary glass wedges 6, 7 are operatively connected with the diaphragm adjusting device of said lens system.

The first or upper base range finder is adjusted by a manually operable gear 8 which projects partially outwardly from the top wall of the camera housing 1 and meshes with a gear 9 which in turn meshes with the gears 10 and 11, the latter of which meshes with a gear 12 preferably formed integral with the screw thread member of the focusing device of the lens system. The gear 10 is an annular gear and forms the mounting for the rotary glass wedge 5. The gear 9 meshes also with a gear 13 which is arranged in a plane behind the plane of gear 10 (Fig. 1) and in turn engages the annular gear 14 in which the rotary glass wedge 4 is mounted to rotate the latter in opposite direction of the glass wedge 5.

In addition to the adjustment of the first range finder and the lens system the rotation of the manually operable gear 8 causes also an adjustment of the diaphragm 15 of the lens system. It will be noted that the gear 9 meshes also with a gear 16 which in turn engages a gear 17 loosely mounted on a stub shaft 18. On this shaft 18 is rotatably supported a cam disc 19 which carries on one of its sides near its circumference the gears 20 and 21 which are in mesh with each other. The gear 20 meshes also with the gear 17, while the gear 21 meshes also with a gear 22 loosely mounted on shaft 18. The gear 22 forms an element of the gearing 22, 23, 24, 25 of the second range finder. Owing to the frictional resistance inherent in this last named gearing the gear 22 cannot be rotated when the gears 16, 17 are set in motion upon manually rotating the gear 8. A rotation of the gear 17, however, causes a rotation of the gear 20 with the result that due to the interposition of the gear 21 the gears 20 and 21 roll along the circumference of the coaxial gears 17 and 22, respectively, thereby swinging the cam 19 which carries the gears 20, 21, about its pivot axis which as mentioned above is formed by the stub shaft 18. The cam 19 controls the oscillation of a lever 26 which is pivotally supported on a stub shaft 27 and is provided with a toothed segment 28 engaging an annular gear 29 preferably integrally formed with the diaphragm adjusting member 30. A spring 31 attached to the lever 26 maintains the heel 26ª of this lever 26 always in engagement with the circumference of the cam disc 19. It will be appreciated from the above that during the focusing of the lens system, effected by rotating the gear 8 and observing the image appearing in the first range finder the diaphragm will also be adjusted, namely to the same points of the object to be photographed upon which the lens system is focused, which may be located for instance in the foreground.

The further or additional adjustment of the diaphragm for the purpose of adjusting the camera for the desired depth of focus is effected with the second range finder, which is adjusted to certain points in the background of the scene to be photographed.

The second range finder is adjusted by rotating a manually operable gear 25, which in similar manner as the manually operable gear 8 extends partially outwardly from the top wall of the camera casing 1. This gear 25 is adapted to operate the gearing 24, 23, 22, which is not only coupled with the diaphragm adjusting device 19, 20, 21, 26, 28, 29, but is also coupled with the rotary glass wedges 6, 7 of said second range finder. The gear 23 meshes with the annular gear 33 in which the glass wedge 7 is mounted, the gear 33 lying in a plane different from that of gear 22 and the gear 22 meshes with an annular gear 32 in which the glass wedge 6 is mounted, whereby these glass wedges 6 and 7 are rotated uniformly and simultaneously in opposite directions. Owing to the frictional resistance inherent in the gear train 17, 16, 9, 10, 11, 8 of the first range finder, this latter gear train will not rotate when the gear train 24, 23, 32, 22, 33 of the second range finder is operated by manual rotation of the gear 25. The gear 20 rolls along the circumference of gear 17 and this results in a swinging of the cam disc 19 about its pivot axis. The lever 26 which is controlled by the cam disc 19 is again actuated and causes an adjustment of the diaphragm 15 to the desired depth of focus extending to the background of the scene to be photographed. The adjustment of the lens system, which previously was completed by the first range finder, remains unchanged during this additional diaphragm adjustment for depth of focus, which is done by adjusting the second range finder.

The image produced by the upper range finder is observed at 34, and the image produced by the lower one is observed at 35. The apertures for admitting light rays to the upper range finder are indicated at 36 and 37, and the apertures for the lower one at 38 and 39. By means of a rhombic prism 40 connected with the rhomboid prism 3 of the lower base range finder, the light rays entering the lower apertures 38, 39 are deflected towards the lower portion of the observation window, as indicated at 35. Fig. 6 shows the two image fields 41, 42 for the upper and lower base range finder. The upper image which is composed of the two superposed images of the upper range finder illustrates that the latter has been sharply adjusted to the object 43, while the object 44, which lies in a plane backward of the object 43 appears improperly assembled. The lower base range finder, which is coupled with the diaphragm adjusting device has been sharply adjusted to the object 44 so that the image of the latter appears properly superposed or assembled in the lower image field 42 as indicated at 44ª. The object 43 which is positioned in a plane in front of object 44 appears to be improperly assembled as indicated at 43ª.

I claim:

1. In a photographic camera, the combination, a photographic lens, means for adjusting said photographic lens, a diaphragm for said lens, means for adjusting said diaphragm, a range finder, manually operable means for actuating both said adjusting means and range finder simultaneously, a second range finder operatively connected with said diaphragm adjusting means and a second manually operable means for actuating said second range finder and said diaphragm adjusting means simultaneously, without changing the adjustment of said first range finder and said photographic lens.

2. In a photographic camera, the combination, a photographic lens, means for adjusting said photographic lens, a diaphragm for said lens, means for adjusting said diaphragm, a range finder, means for operatively connecting said range finder with both aforesaid adjusting means, a second range finder, and means operatively connecting said second range finder with said diaphragm adjusting means for operating the latter independently of the said first range finder whenever said second range finder is adjusted, and coupling means connecting said operative connections between said two range finders and said diaphragm adjusting means respectively with each other, said coupling preventing the operation of one range finder by the other.

3. In a photographic camera, the combination, a photographic lens, means for adjusting said photographic lens, a diaphragm for said lens, means for adjusting said diaphragm, a range finder provided with a pair of rotary optical wedges rotatable simultaneously in opposite directions, manually operable means for actuating both said adjusting means and said pair of rotary wedges simultaneously, said rotary wedges being adapted to bring predetermined parts of the object to be photographed into registration in the composite image produced by range finder, a second range finder provided with a pair of rotary optical wedges rotatable simultaneously in opposite directions, a second manually operable means for actuating said diaphragm adjusting means simultaneously with the rotary wedges of said second range finder, said second manually operable means upon operation of said range finder to bring other predetermined parts of the object to be photographed into registration in the composite image produced by said second range finder operating said diaphragm adjusting means independently of said first mentioned manually operable means associated with the first mentioned range finder, and coupling means for connecting said two manually operable means, said coupling connecting both said manually operable means with said diaphragm adjusting means and preventing the operation of one range finder by the other.

4. In a photographic camera, the combination, a photographic lens, means for adjusting said photographic lens, a diaphragm for said lens, means for adjusting said diaphragm, a range finder, means operatively connecting said range finder with both said adjusting means, a second range finder, means operatively connecting said second range finder with said diaphragm adjusting means for operating the latter independently of said first range finder whenever said second range finder is adjusted, coupling means connecting said operative connections between said two range finders and said diaphragm adjusting means respectively with each other, said coupling preventing the operation of one range finder by the other, an observation window for both said range finders, and means associated with one of said range finders for deflecting the light rays in such a manner into said window that the composite images of both range finders appear next to each other.

5. In a photographic camera, the combination, a photographic lens, means for adjusting said photographic lens, a diaphragm for said lens, means for adjusting said diaphragm, a range finder, means operatively connecting said range finder with both said adjusting means, means for manually operating said operative connecting means, a second range finder, means for operatively connecting said second range finder with said diaphragm adjusting means, a second means for manually operating said last named operative connecting means, both said operative connecting means including each a gear loosely mounted upon a common shaft one adjacent the other, a cam mounted on said shaft, two pinions rotatably mounted each on a separate shaft attached to said cam, said pinions meshing with each other and also meshing each with one of said gears, said cam being adapted to be oscillated about the axis of said common shaft by either one of said gears whichever one is actuated by its associated operative connecting means, and a pivotally mounted member engaging said cam and adapted to operate said diaphragm adjusting means.

6. In a photographic camera, the combination of a photographic lens system provided with an adjustable diaphragm, means for adjusting said lens system and means for adjusting said diaphragm, of two range finders, two trains of gears, each provided with manually operable means for rotating the same, one of said trains of gears being operatively connected with one of said range finders, said diaphragm adjusting means and said lens system adjusting means, the other train of gears being operatively connected with the second range finder and also with said diaphragm adjusting means, a pivotally mounted lever adapted to operate said diaphragm adjusting means, a cam controlling the pivoted movement of said lever, a shaft on which said cam is mounted, two gears loosely mounted on said shaft and meshing each with one of said trains of gears, and two pinions mounted on separate shafts carried by said cam, said pinions meshing with each other and each with one of the gears connected to said trains of gears.

7. In a photographic camera, the combination, a photographic lens, a diaphragm for said lens, means for adjusting said lens, a lever for adjusting said diaphragm, two range finders, each including two spaced reflecting faces forming a base, means for deflecting the composite image of the object to be photographed and as produced by one of said range finders into an observation window common to both range finders, said deflecting means being arranged behind one reflecting face of the respective range finder, said observation window being positioned behind one reflecting face of the other range finder, two manually operable means, one for each said range finders, one of said manually operable means adjusting simultaneously with its associated range finder said lens adjusting means and said diaphragm adjusting lever, said manually operable means including a train of gears operatively connected with said lens adjusting means and also with a gear loose on a shaft, a cam on said shaft, a pinion rotatably mounted on said cam and meshing with said gear, said cam engaging and controlling the movement of said diaphragm adjusting lever, the second manually operable means including a train of gears, a second gear loose on said shaft and driven by said last named train of gears, and a second pinion rotatably mounted on said cam and meshing with said first named pinion and with said second gear, whereby said diaphragm adjusting lever is adapted to be moved by said second manually operable means, without affecting the adjustment of the photographic lens and said first range finder.

8. In a photographic camera, the combination, a photographic lens, means for adjusting said lens, an adjustable diaphragm for said lens, a lever adapted to adjust said diaphragm, two range finders, manually operable means for adjusting one of said range finders and for simultaneously influencing said diaphragm adjusting lever and said lens adjusting means, a second manually operable means for simultaneously adjusting said second range finder and said diaphragm adjusting lever, a cam, said diaphragm adjusting lever engaging said cam, two gears loosely rotatable about the axis of said cam, each of said gears meshing with a pinion rotatably mounted on said cam, said pinions meshing with each other, said gears being each driven by a train of gears, each of which being operated by one of said manually operable means, the lens adjusting means being in operative connection with one of said train of gears.

GERHARD HENKEL.